Nov. 15, 1927.
O. C. BREWSTER
1,649,096
CENTRIFUGAL BOWL SEPARATOR
Filed Nov. 19, 1921  2 Sheets-Sheet 1
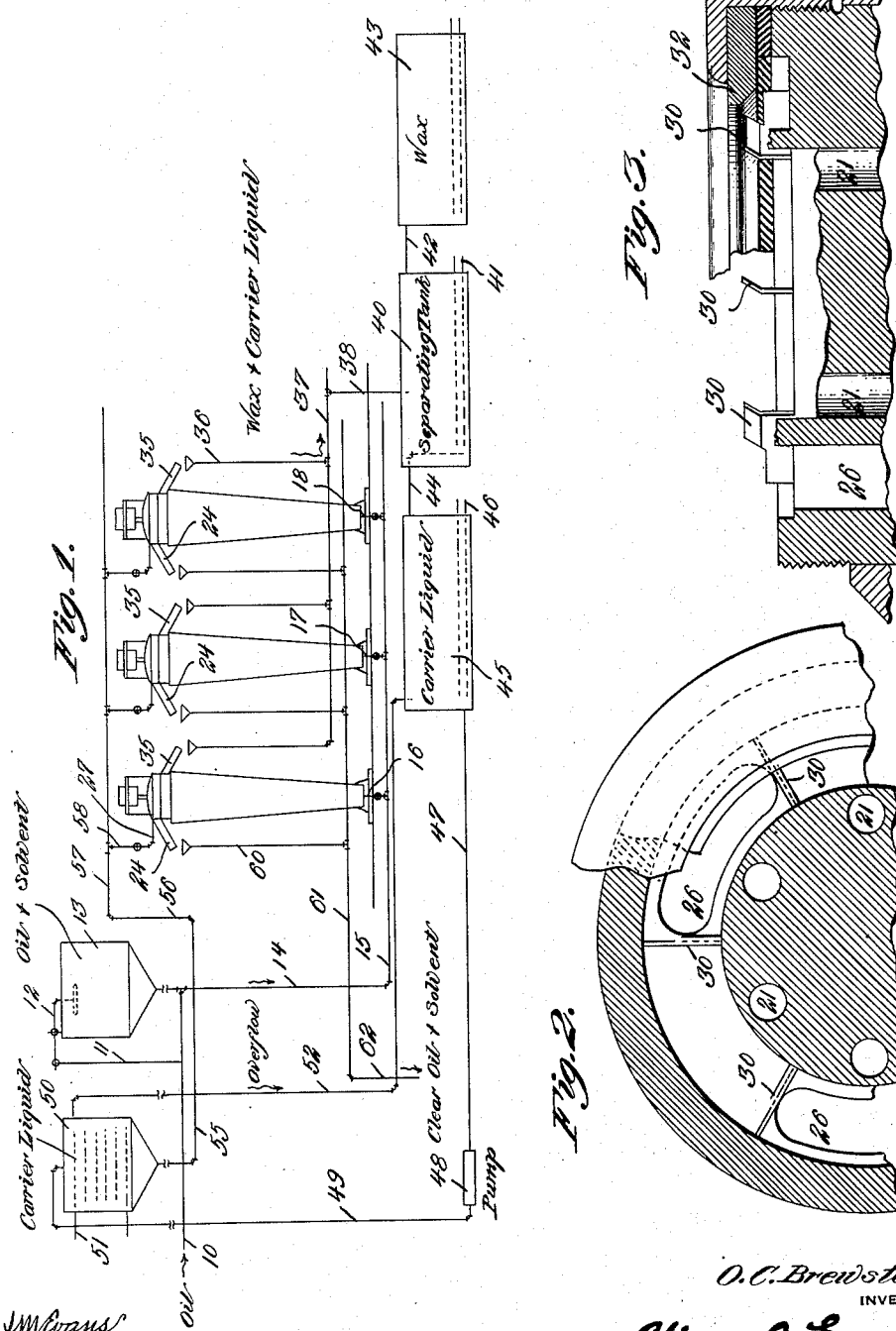
O. C. Brewster
INVENTOR
BY Victor J. Evans
ATTORNEY Nov. 15, 1927.
O. C. BREWSTER
1,649,096
CENTRIFUGAL BOWL SEPARATOR
Filed Nov. 19, 1921
2 Sheets-Sheet 2
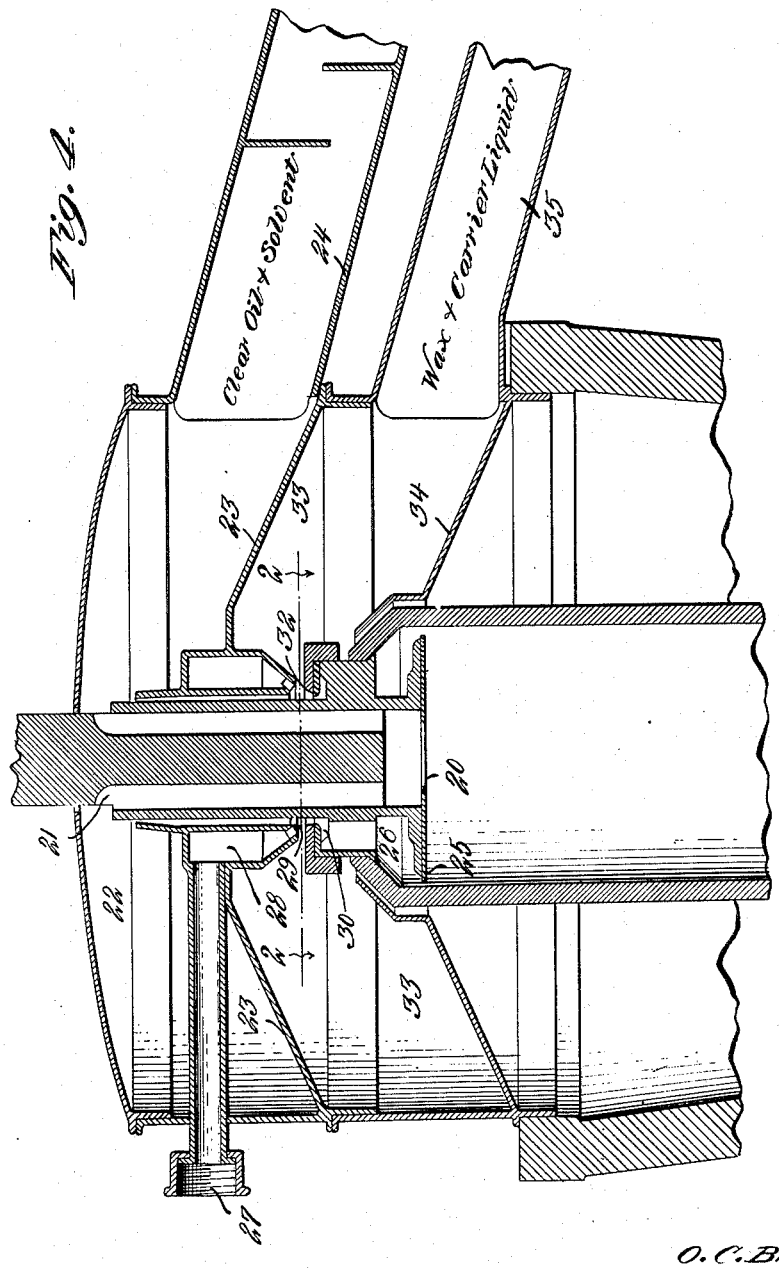

Patented Nov. 15, 1927.

1,649,096

UNITED STATES PATENT OFFICE.

OSWALD C. BREWSTER, OF CASPER, WYOMING, ASSIGNOR TO THE SHARPLES SPECIALTY COMPANY, A CORPORATION OF DELAWARE.

CENTRIFUGAL BOWL SEPARATOR.

Application filed November 19, 1921. Serial No. 516,500.

The present invention relates to a centrifugal bowl separator, suitable for many purposes, and especially suitable for treating oils for the removal of waxy materials, namely, materials which are liable to solidify when the oil is brought to some particular temperature.

It has heretofore been proposed to dilute lubricating oil of the character referred to with a solvent thereof such as naphtha or gasoline, to refrigerate the mixture, and to inject the refrigerated mixture, together with a refrigerated carrier liquid of about the same temperature, into a centrifugal bowl separator, the liquid oil flowing out from the outlet nearest the center and the carrier liquid and wax flowing out through the outlet nearest the periphery.

Apparatus within the scope of my present invention is shown in the annexed drawings, in which Fig. 1 represents in a diagrammatic way, an elevation of the entire apparatus, three centrifugal machines being shown therein, but it is obvious that any desired member can be employed. Fig. 2 represents a horizontal section with parts broken away of the centrifugal separator, taken approximately on line 2—2 of Fig. 4. Fig. 3 is a detailed section with parts broken away of the upper part of the centrifugal separator and Fig. 4 is a vertical section with parts broken away of a preferred construction of the upper part of the centrifugal liquid separator.

For the purpose of describing the construction and operation of the device, the use thereof in treating a solution of heavy lubricating oil for the separation therefrom of amorphous wax (petrolatum) will be given, as an example of using the separator. Refrigerated oil or preferably the refrigerated mixture of oil and solvent, enters through pipe 10, (optionally through pipe 11 and pipe 12) into a tank 13 in which a constant head of liquid is maintained, for example by a suitable float in the tank connected with a valve in pipe 12. The liquid flows downwardly continuously through pipe 14 into the header 15 from which it is supplied continuously in regulated quantities to the centrifugal machines, by the valved pipes 16, 17 and 18. The bowls of the centrifugals already carry the film of carrier liquid, which may be any liquid which is not miscible with the oil or solution of oil under treatment, a solution of calcium chloride, common salt or the like, or in some cases clear water being suitable for the purpose. There is then produced in the centrifugal bowl three strata, the outermost or heaviest being the carrier liquid, the next being the precipitated wax and the innermost being the oil freed from wax by the centrifugal action. The liquid oil overflows (passes inside of) the ring dam 20 and passes upwardly through the channels 21 and discharges within the upper cover 22, from which it falls down on to the plate 23 and is drawn off through spout 24. The wax passes under (outside of) the dam 25, into the space 26. The dams 20 and 25 preferably form the internal and external boundaries of a single annular plate, as shown. The wax may be melted by hot carrier liquid introduced through pipe 27 into the chamber 28 provided with openings, or preferably with a narrow slit 29, at its lower end. This liquid is projected into the space 26 by means of fins or blades 30, three of which are illustrated in Fig. 3, the left hand one being bent backward and the right hand one being bent forward. The middle one of these three fins shows the preferred amount of bending. These fins, rapidly rotating, engage the liquid projected from 29 and impart to such liquid the same rotary motion which the bowl has, and project the liquid downwardly into the compartment 26. This liquid is hot and accordingly melts the wax in the compartment 26, the molten wax and hot carrier liquid flowing out over the ring dam 32, into the space 33 on to the lower cover 34 and out through the spout 35 which spout may be, as shown in Fig. 4, on the same side of the machine as the spout 24, or these two spouts may be on opposite sides, as shown in Fig. 1.

It is to be understood that the adjustment of the ring dam 20 and of the ring dam 32 will be such as to give the desired separation, in combination with the speed of the centrifugal machine. The centrifugal is when used as above described, operated at high speed, for example, 15,000 revolutions per minute.

The amount of hot liquid injected through 27 is preferably such as to maintain the wax in a freely molten condition in the spout 35, pipes 36, header 37 and pipe 38. The mixture of wax and carrier liquid flows into the separating tank 40, which tank is provided with a suitable heating coil 41, a steam coil being suitable for this purpose. In the tank 40 the liquids stratify the wax flowing through pipe 42 into a tank 43, from which the wax can be drawn off and further treated in any desired way, for the production of ˛etrolatum or other suitable product. The hot carrier liquid which separates in tank 40 is drawn off through pipe 44 into a heating tank 45 in which the temperature of this liquid is kept up by a suitable coil 46. This liquid is pumped out through pipe 47, pump 48 and pipe 49 into a liquid tank 50 which tank is likewise provided with a suitable steam coil or other heating coil 51. A pipe 52 from the upper part of the tank 50 may carry away any excess of carrier liquid pumped into the tank and return it to tank 45. The liquid from tank 50 flows through pipes 55, 56 into the header 57, from which branch pipes 58 provided with suitable valves supply the liquid to pipes 27.

The clear oil flowing out from spouts 24 runs into spouts 60 into the header 61 and may be drawn off at 62.

It is of course to be understood that the device is not limited to the specific use above given, and that the invention is not restricted to all of the details of construction mentioned above, but the invention is of broad application, and the claims are intended to be so construed.

I claim:

1. The centrifugal mechanism comprising a revolving centrifugal bowl having an inlet for a substance to be separated and outlets respectively for lighter and heavier separated constituents of the substance, and means delivering hot carrier liquid into the outlet for the heavier constituent.

2. The centrifugal mechanism comprising a revoluble bowl having means whereby a substance to be separated is delivered within one end thereof and passages comprising an annular channel at the other end thereof for discharging the separated constituents, in combination with an annular conduit having means for delivering a carrier liquid to said bowl through said channel.

3. In a centrifugal machine, a vertical bowl, internal and external dams near the upper part of the bowl, the said external dam forming a compartment in the upper portion of the bowl, said portion having an outlet nearer to the axis of rotation than said external dam, means directing a jet of hot liquid into said last mentioned outlet.

4. In apparatus for the separation of wax from petroleum oil, a rotating centrifugal bowl having an inlet for wax-containing oil and separate outlets respectively for separated oil and wax, and means directing a jet of hot liquid into said wax outlet during the discharge of wax therefrom.

5. In apparatus for the separation of wax from petroleum oil, a rotating centrifugal bowl having an inlet for wax-containing oil and an outlet for de-waxed oil and a passage extending from a radially outward point of the interior of the bowl to a radially inward point of the bowl for the discharge of wax, and means passing hot liquid into outlet of said passage and thereby heating wax therein.

6. In apparatus for the separation of wax from petroleum oil, a rotating centrifugal bowl having an inlet for wax-containing oil and separate outlets respectively for separated oil and wax, means for feeding liquid to the wax outlet of the bowl, and members in said wax outlet impelling into said outlet liquid fed thereto during the rotation of the bowl.

In testimony whereof I affix my signature.

OSWALD C. BREWSTER.